(12) United States Patent
Yan et al.

(10) Patent No.: US 6,871,844 B2
(45) Date of Patent: Mar. 29, 2005

(54) HUMIDIFIER

(75) Inventors: Yi-Yie Yan, Hsinchu (TW); Jar-Lu Huang, Judung Hsinchu (TW); Keh-Chyun Tsay, Judung Hsinchu (TW); Falin Chen, Judung Hsinchu (TW); Hsin-Sen Chu, Judung Hsinchu (TW)

(73) Assignee: Industrial Technology Research Institute, Hsin Chu Hsien (TW)

( * ) Notice: Subject to any disclaimer, the term of this patent is extended or adjusted under 35 U.S.C. 154(b) by 0 days.

(21) Appl. No.: 10/334,787

(22) Filed: Jan. 2, 2003

(65) Prior Publication Data

US 2004/0084789 A1 May 6, 2004

(51) Int. Cl.⁷ .................................................. B01F 3/04
(52) U.S. Cl. ........................... 261/154; 261/16; 261/99; 261/156
(58) Field of Search ........................... 261/16, 99, 104, 261/107, 154, 156, 157, 161

(56) References Cited

U.S. PATENT DOCUMENTS

| | | | | |
|---|---|---|---|---|
| 3,432,357 A | * | 3/1969 | Dankese ........................ | 429/34 |
| 3,735,559 A | * | 5/1973 | Salemme ........................ | 95/52 |
| 4,101,294 A | * | 7/1978 | Kimura .......................... | 48/77 |
| 4,758,385 A | * | 7/1988 | Acker et al. .................. | 261/153 |
| 5,123,481 A | * | 6/1992 | Albers et al. ................ | 165/111 |
| 5,718,848 A | * | 2/1998 | James .......................... | 261/128 |
| 6,669,177 B2 | * | 12/2003 | Shimanuki et al. ........... | 261/96 |
| 2001/0015500 A1 | * | 8/2001 | Shimanuki et al. .......... | 261/104 |

* cited by examiner

Primary Examiner—Scott Bushey
(74) Attorney, Agent, or Firm—Arent Fox PLLC

(57) ABSTRACT

A humidifier for fuel cells includes a housing with a heat-exchange plate formed therein, the plate defining first and second gas passages having gas inlets and outlets, respectively; a plurality of apertures formed on the plate; and a plurality of reservoirs fixed under the apertures and filled with a water absorbable and permeable stuffing material for trapping and storing water. The water permeable stuffing material may be disposed in the first gas passage. Cool, dry oxygen/air is channeled to the first gas passage and conveyed to an oxygen/air inlet of the fuel cell, and high-temperature, high-moisture exhaust gas discharged from the fuel cell is introduced to the second gas passage, such that water and heat of the exhaust gas in the second gas passage are recycled by the heat-exchange plate and conveyed to the first gas passage, thereby achieving the humidification effect and improving electricity-generating efficiency of the fuel cell.

13 Claims, 7 Drawing Sheets

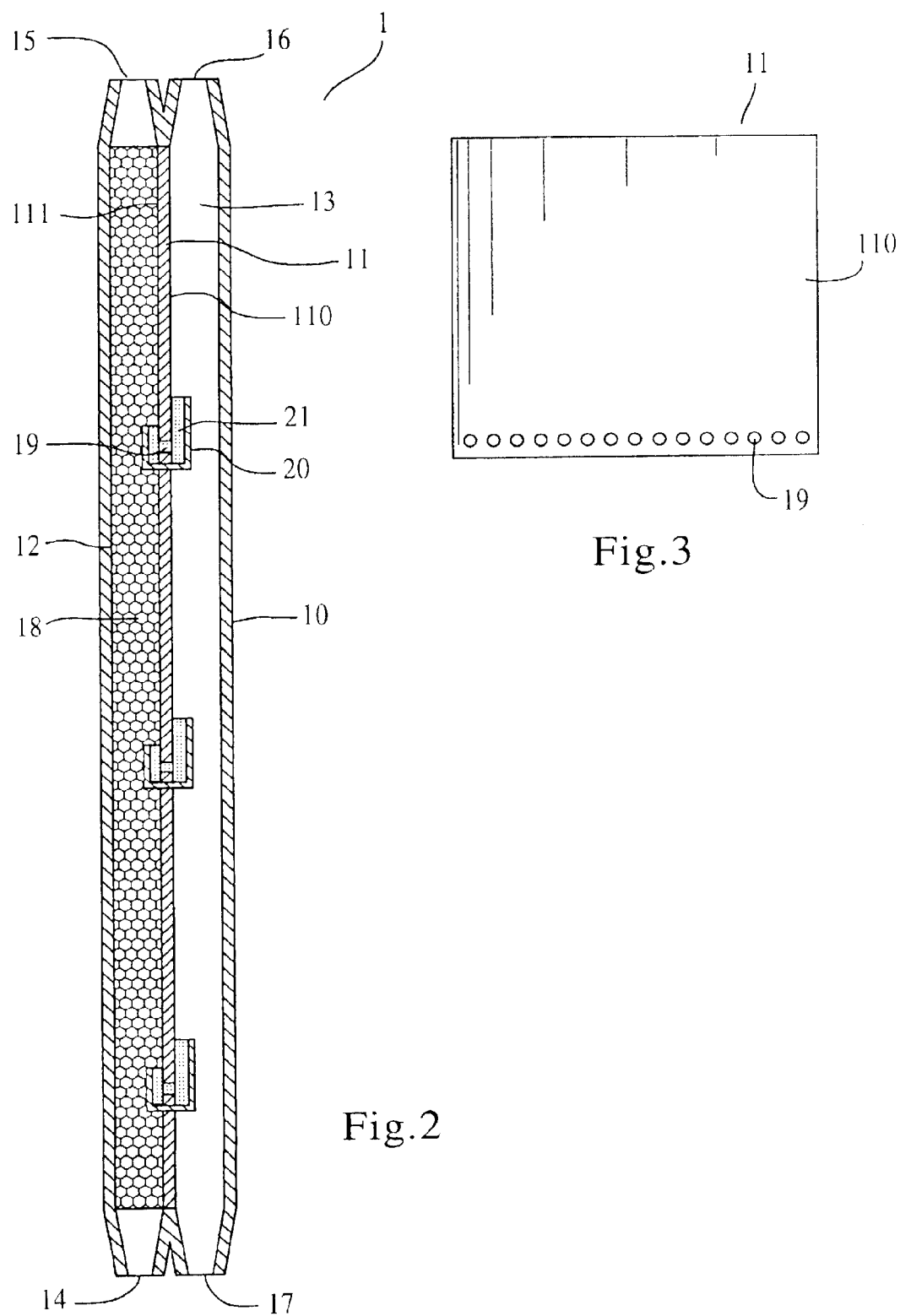

HUMIDIFIER

BACKGROUND OF THE INVENTION

1. Field of the Invention

The present invention relates to a humidifier, more particularly, a humidifier applied in a fuel cell system by recycling high-temperature and high-moisture exhaust gas discharged from the fuel cell, and transferring water and heat acquired from the recycling process to air or oxygen about to be drawn into the fuel cell, thus achieving effective humidification and increasing the efficiency of the fuel cell system.

2. Description of the Related Art

The Proton-Exchange Membrane Fuel Cell (PEMFC) consists of a plurality of cell units, with each of the cell unit comprising the bi-polar plate, membrane electrode assembly (MEA) and the gasket, wherein the MEA is formed by applying a layer of catalyst and adhering a layer of carbon cloth or carbon paper on a layer of polymer membrane (such as Nafion manufactured by DuPont); the bipolar plate is formed by conductive material, such as graphite, inlayed with gas passages, which convey gas proportionally and swiftly to the top surface of the MEA, thus generating electronic reactions with the catalyst and electrons and other yields are produced. Such electrons can be formed as utilizable electric current via external bridge passageway, and other yields therefrom (such as water and heat) are to be discharged externally via related means.

Since fuel cells utilize reactions between hydrogen and oxygen/air to generate power, they are considered a clean energy source, for the only waste material discharged during such reaction process is water and heat without any chemical or physical waste being produced that might cause environmental or biological concerns and would require higher costs and complicated processing procedures, as do other types of energy-generating sources.

Volumes of electric current and power generated by fuel cells determine the efficiency of fuel cells, and factors controlling volumes of electric current and power generated by fuel cells then include the design of gas passages within the bipolar plate, effective area of the catalyst, the characteristics of polymer membrane material, the thickness and degree of porosity for the electrode layer, wherein the characteristics of polymer membrane material are to separate positive and negative gas molecules and isolate electrons but allow water molecules and hydrogen ions to permeate, thus acquiring the effect of an electrical bridge. Hydrogen ions need to be brought along by water molecules to permeate through the polymer membrane, and hydrogen ions acquire better permeation as the moisture of the polymer membrane goes higher. Therefore, it is one of the key technologies in fuel cells as to how the moisture of the polymer membrane can be kept for acquiring better conduction efficiency out of ions. Please refer to U.S. Pat. Nos. 5,484,666, 6,190,793 and 6,207,312 for detailed structures of PEMFC, bipolar plates and MEAs thereof.

According to the psychrometric chart, the moisture for fully saturated air increases curvingly as temperature rises. For example, under the constant temperature of 25° C., the partial pressure for saturated water vapor is 0.032 kg/cm$^2$, whereas under the constant temperature of 65° C., the partial pressure for saturated water vapor reaches 0.245 kg/cm$^2$. Since the operational temperature for PEMFCs is between 60° C. to 85° C., air before being introduced into a fuel cell may be fully saturated already, yet as such air is introduced into a fuel cell, the relative moisture for such air is swiftly lowered by heightened temperature, thus such air is caused to have strong moisture absorption capacity after entering a fuel cell. Therefore, as such air enters a fuel cell, such air immediately absorbs the internal moisture of the fuel cell when contacting the polymer membrane therein, thus causing the polymer membrane to contain such a low degree of moisture that not only decreases the conduction capacity of the membrane ions but also decreases the efficiency of the fuel cell.

Therefore, it is crucial for the efficiency of fuel cells to properly heat and moisturize air before such air enters fuel cells. Since the moisture-containing capacity of air increases as temperature rises, sufficient heating of air should correspondently proceed as air is moisturized. Consequently, it is crucial for increasing the efficiency of fuel cells as to how air or oxygen entering fuel cells can be moisturized and heated. In addition, high-temperature and high-moisture air discharged from the negative electrode in the fuel cell or a fuel processor generating hydrogen can be utilized as the best means for pre-heating air/oxygen. Thus it is the most direct and effective way to moisturize and heat the system air by utilizing directly pure water (or water vapor) yielded from the fuel cell (negative electrode). Generally, total heat exchangers are utilized for effective exchange of temperature and moisture, which means the effective exchange of both the sensible heat and the latent heat is acquired simultaneously via total heat exchangers.

The conventional total heat exchangers provide the rotor adsorption and permeable membrane designs, wherein the working principle for the rotor adsorption design is to utilize all kinds of moisture-absorbing material as media for transferring moisture and heat, the total heat exchanging rotor is then caused to rotate through an external generator, thus achieving the exchange of moisture and heat from both the cool and hot airflows, whereas the working principle for the permeable membrane design is to select a material permeable by moisture but not by air or a micro-porous material having excellent moisture-absorbing capacity as the membrane to be placed between a dry and cool airflow and a moist and hot airflow, thus achieving the exchange of water and heat.

However, when applied in fuel cell systems, the total heat exchanger with rotor adsorption design is to cause numerous drawbacks, for example, the selection of adsorbents has to be extremely cautious since adsorbents cause tremendous impact on the function of fuel cells, therefore, once an alkali compound is chosen as the adsorbent, the function of fuel cells is to be adversely affected tremendously with the battery life thereof being significantly limited; furthermore, the cost of utilizing the total heat exchanger with rotor adsorption design is higher and power is needed for generating rotors, thus the electricity expenses for fuel cells become more difficult to be lowered, not to mention the efficiency for the total heat exchanger with rotor adsorption design is generally lower than 50%.

On the other hand, when applied in fuel cell systems, the total heat exchanger with permeation membrane design provides better exchanging effect between water and heat with the cost thereof being lower than that of the total heat exchanger with rotor adsorption design, yet since membrane material is mostly made of polymer or porous material, the heat conductabty thereof is to be lower than that of metal material; furthermore, since porous material is utilized as the membrane, when under the conditions of the membrane having large area and the pressure difference being constant on the two sides, gases on both sides having pressure differences are to permeate therethrough, consequently the pores of the membrane are to be clogged either by being deformed through containing moisture or by being accumulated with minute particles in the air, thus causing the system to be unstable and the function thereof to be difficult to control.

Therefore, both conventional humidifying devices applied in fuel cells cause drawbacks requiring improvements.

SUMMARY OF THE INVENTION

The primary object of the present invention is to provide a humidifier having a housing wherein a first gas passage for dry and cool oxygen/air to pass through before entering the fuel cell, and a second gas passage for conveying high-temperature and high-moisture exhaust gas discharged by the fuel cell are disposed, thus through heat exchanging plates mounted between the first and second gas passages, water and heat in the exhaust gas of the second gas passage are recycled and conveyed to the first gas passage to achieve the humidification effect and increase the efficiency of the fuel cell.

A humidifier capable of achieving the foregoing objects comprises a housing, heat exchanging plates, water-trapping reservoirs and water absorbable and permeable material, wherein the interior of the housing is divided into a first gas passage and a second gas passage, with the first and second gas passages respectively having gas inlets and gas outlets, and water saturation apertures are mounted underneath the heat exchanging plates and water-trapping reservoirs are mounted underneath the water saturation apertures, with water absorbable and permeable material filled in the water-trapping reservoirs.

Preferably, the gas inlet for the first passage of the present invention is for conveying air or oxygen therein, whereas the gas outlet communicates with the air or oxygen inlet of the fuel cell, the gas inlet of the second gas passage is for conveying therein high-temperature and high-moisture exhaust gas having lower oxygen content, and the gas outlet of the second gas passage is for discharging the exhaust gas after being cooled Preferably, the heat-exchanging plates are made of metal, and the surface of the heat-exchanging plates facing towards one side of the first gas passage are the evaporation surface and the surface of the heat-exchanging plates facing towards one side of the second gas passage are the condensation surface; the condensation surface may condense moisture in the exhaust gas in the second gas passage into water drops which flow via the water saturation apertures to the evaporation surface and are evaporated in the first gas passage so as to moisturize air or oxygen in the first gas passage.

Preferably, the heat-exchanging plates are vertically mounted, and at least one heat-exchanging plate is mounted.

Preferably, the water-trapping reservoirs of the present invention can be formed as U shape, L shape, H shape or V shape, so as to trap water drops condensed in the second gas passage; at least one such water-trapping reservoir is mounted.

Preferably, the location of the water-trapping reservoirs on one side of the second gas passage is higher than that of the water saturation apertures.

Preferably, the water permeable stuffing material, such as non-woven fabrics or porous pottery and porcelain material, is disposed in the first gas passage.

Preferably, the evaporation surface of the heat-exchanging plates of the present invention are disposed with a plurality of fins for increasing the evaporation area.

Preferably, the evaporation surface of the heat-exchanging plates are coarsely processed so as to increase the evaporation area.

Preferably, the condensation surface of the heat-exchanging plates are disposed with a plurality of fins so as to increase the heat-conducting area.

Preferably, the condensation surface of the heat-exchanging plates are hydrophobically processed, which refers to the application of a layer of Teflon membrane thereon, so as to cause the condensation water to speedily slide downwards.

Preferably, the first gas passage is fully filled with the water permeable stuffing material, such as non-woven fabrics or porous pottery and porcelain material.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

FIG. 2 shows a sectional structural view from the left side of the humidifier in FIG. 1;

FIG. 3 shows a plain-surface structural view of the heat-exchanging plate in the present invention;

DETAILED DESCRIPTION OF THE PREFERRED EMBODIMENT

The following is a detailed description of the best presently known modes of carrying out the inventions. This description is not to be taken in a limiting sense, but is made merely for the purpose of illustrating the general principles of the inventions.

Figure 1:
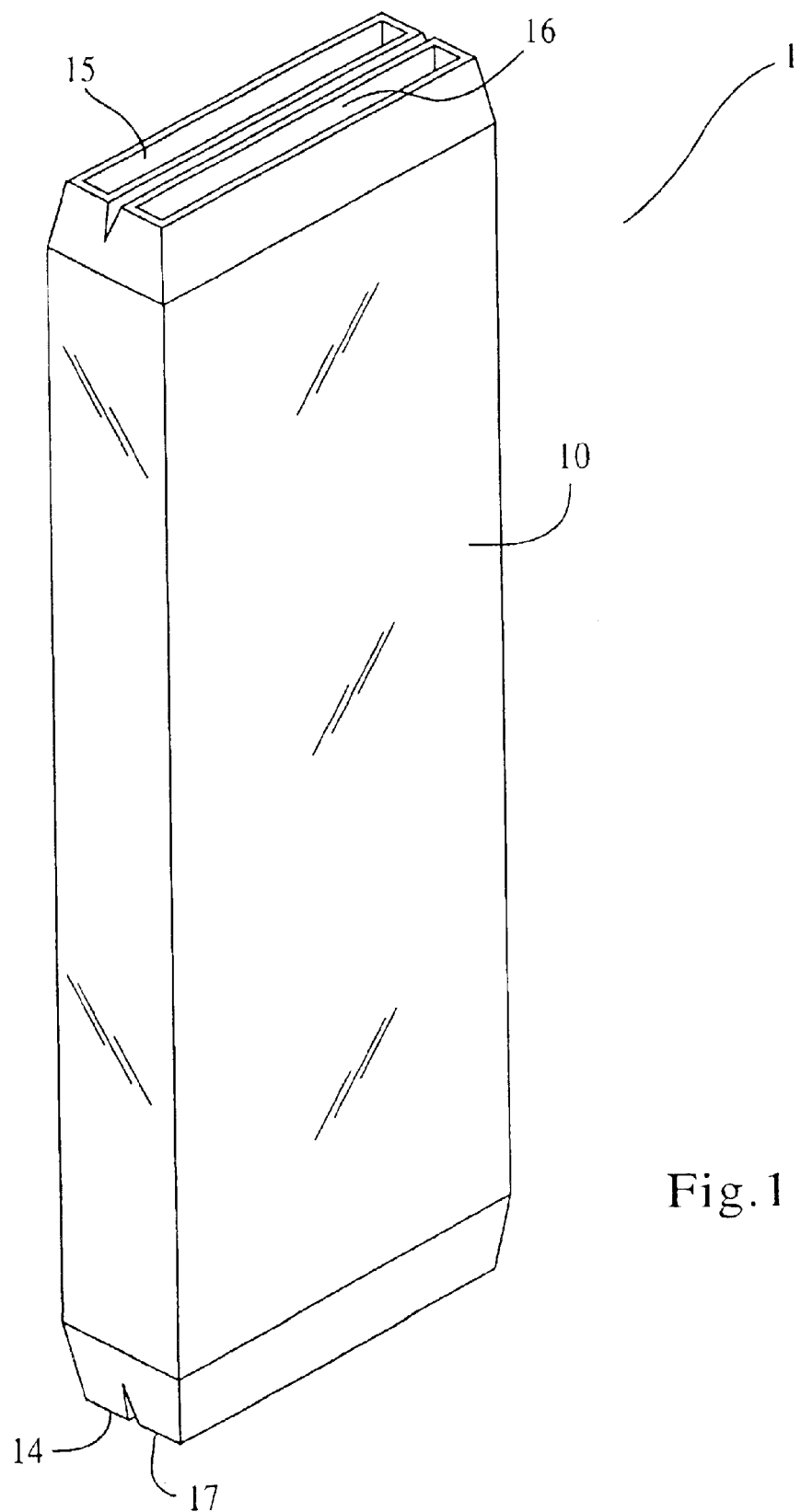
FIG. 1 shows an externally perspective view of the present invention.

Please refer to FIGS. 1 to 3, the humidifier 1 of the present invention comprises a housing 10, a plurality of heat-exchanging plates 11, water permeable stuffing material 18, a plurality of water-trapping reservoirs 20 and a plurality of water absorbable and permeable material 21, wherein the plurality of heat-exchanging plates 11 are vertically fixated within the housing 10 and divide the interior of the housing 10 into a first gas passage 12 and a second gas passage 13, a gas inlet 14 and a gas outlet 15 are respectively formed underneath and on top of the first gas passage 12, and a gas outlet 17 and a gas inlet 16 are respectively formed underneath and on top of the first gas passage 12; one side of each heat-exchanging plate 11 facing the first gas passage 12 is an evaporation surface 111 and another side of each heat-exchanging plate 11 facing the second gas passage 13 is a condensation surface 110, and at least one water saturation aperture 19 is disposed underneath most heat-exchanging plates 11; the water-trapping reservoirs 20 are correspondingly mounted underneath the heat-exchanging plates 11 having water saturation apertures 19, and the location of the water-trapping reservoirs 20 on one side of the second gas passage 13 is higher than that of the water saturation apertures 19; the water absorbable and permeable material 21 is to fill the water saturation apertures 19 underneath the heat-exchanging plates 11, and the water permeable stuffing material 18 is placed in the first gas passage 12.

Figure 4:
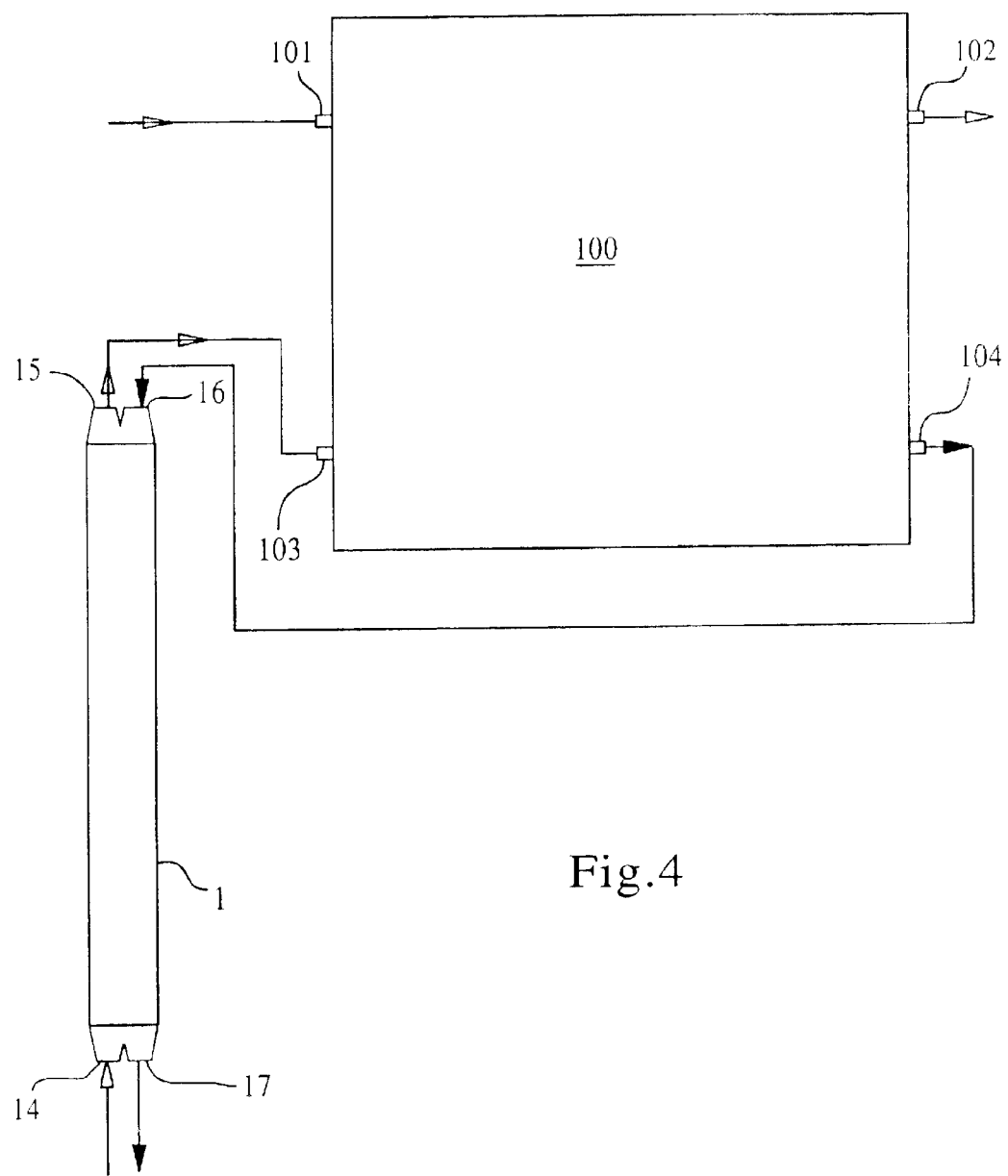
FIG. 4 shows a schematic diagram regarding the integration between the present invention and a fuel cell.
Figure 5:
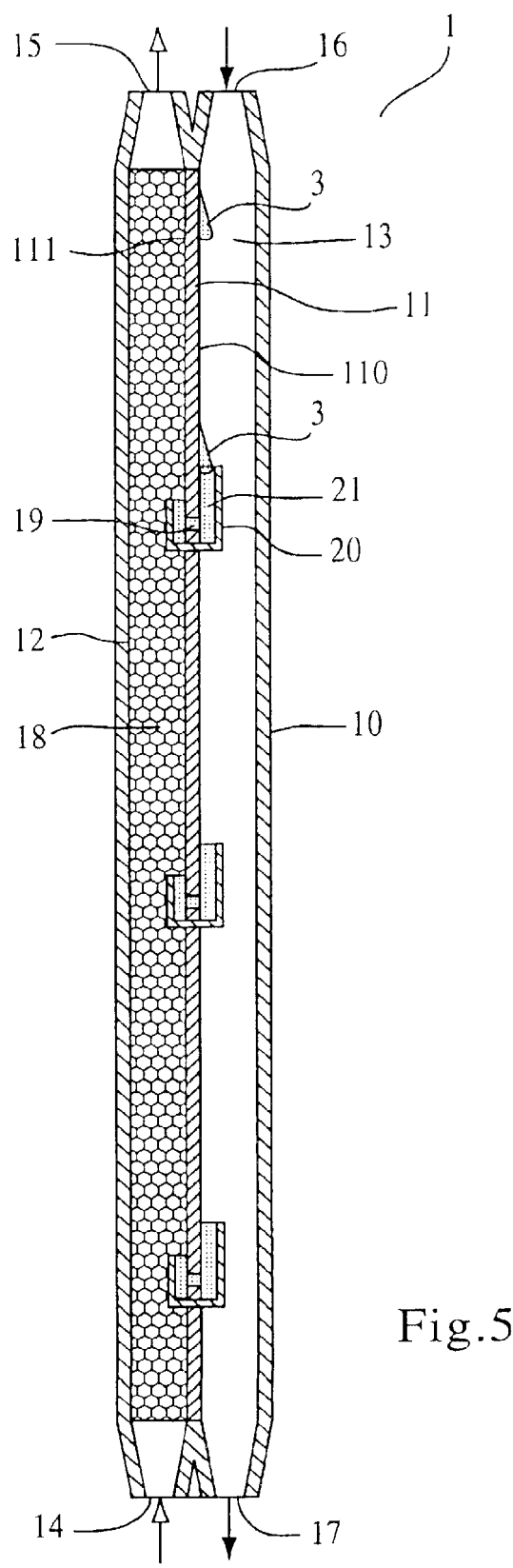
FIG. 5 shows a sectional structural view of air (or oxygen) and exhaust gas being conveyed into the present invention shown in FIG. 4.

The operational procedure of the humidifier 1 of the present invention is to be elaborated in accordance with FIGS. 4 and 5.

As shown in FIG. 4, a common fuel cell 100 comprises a gas-burning inlet 101, a gas-burning tail gas inlet 102, an oxygen/air inlet 103 and an exhaust gas outlet 104, and the humidifier 1 of the present invention is to be connected to the fuel cell 100 with means of vertical fixation via certain conduits, which means the gas outlet 15 of the humidifier 1 is connected to the oxygen/air inlet 103 of the fuel cell 100 via conduits, and the gas inlet 16 is connected to the exhaust gas outlet 104 via conduits. Please refer to FIG. 4, dry and cool oxygen/air is conveyed through the gas inlet 14 of the humidifier 1 into the first gas passage 12, and then such oxygen/air is caused to flow to the oxygen/air inlet 103 of the fuel cell 100 through the water permeable stuffing material 18, subsequently, with the operation of the fuel cell 100, high-moisture and high-temperature exhaust gas generated by the fuel cell 100 is conveyed via the exhaust gas 104 to the gas inlet 16 of the humidifier 1 and then caused to enter into the second gas passage 13.

Since the first and second gas passages 12 and 13 are divided by the heat-exchanging plates 11 which are made of metal (for metal provides high heat conduction coefficient), as moist and hot exhaust gas in the second gas passage 13 gets into contact with the high-efficiency heat conduction surface of the heat-exchanging plates 11 (the condensation surface 110), heat energy of moist and hot exhaust gas is conveyed to the first gas passage 12 via the condensation surface 110 to meet the dry and cool oxygen/air therein since the temperature of the moist and hot exhaust gas is higher than that on the condensation surface 110, thus achieving the effect of heating oxygen/air drawn in and cooling the moist and hot exhaust gas. To elaborate in more detail, since the moist and hot exhaust gas is swiftly cooled by the condensation surface 110 of the heat-exchanging plates 11, moisture thereof is then condensed into the condensation water 3 that subsequently slides downwardly along the condensation surface 110 due to the gravitational force to the U-shaped water-trapping reservoirs 20 and is kept therein, eventually both sides of the water saturation apertures are submerged by water. For avoiding airflows on both sides are to crossflow due to the pressure difference, water-trapping reservoirs 20 are further placed with water absorbable and permeable material 21 such as non-woven fabrics or porous pottery and porcelain material, such that the condensation water 3 is drawn by the absorption force from the water absorbable and permeable material 21 into the first gas passage 12 so as to avoid the crossflow by airflows on both sides.

The water permeable stuffing material 18 is made of porous stuffing material such as non-woven fabrics or porous pottery and porcelain material, such that the condensation water 3 is proportionally distributed on the evaporation surface 111 of the heat-exchanging plate 11 and the contact area between water and air is increased, the condensation water 3 is consequently absorbed swiftly by oxygen/air drawn in, and the synchronized conveyance of heat and the humidification effect for oxygen/air are both improved.

Therefore, as shown in FIG. 5, water and heat in exhaust gas in the second gas passage 13 are recycled by the heat-exchanging plate 11 and transferred to the first gas passage 12, thus achieving the humidification effect for oxygen/air drawn in, so as to increase the efficiency of the fuel cell.

The objects of mounting a plurality of heat-exchanging plates 11 and a plurality of water-trapping reservoirs 20 are not only for water permeation and avoiding the crossflow from airflows on both sides, but also for avoiding the condensation water 3 to continue accumulating downwardly, thus conducive to reducing the membrane thickness of the condensation water 3 so as to improve on heat conduction and condensation efficiency.

Figures 6, 7:
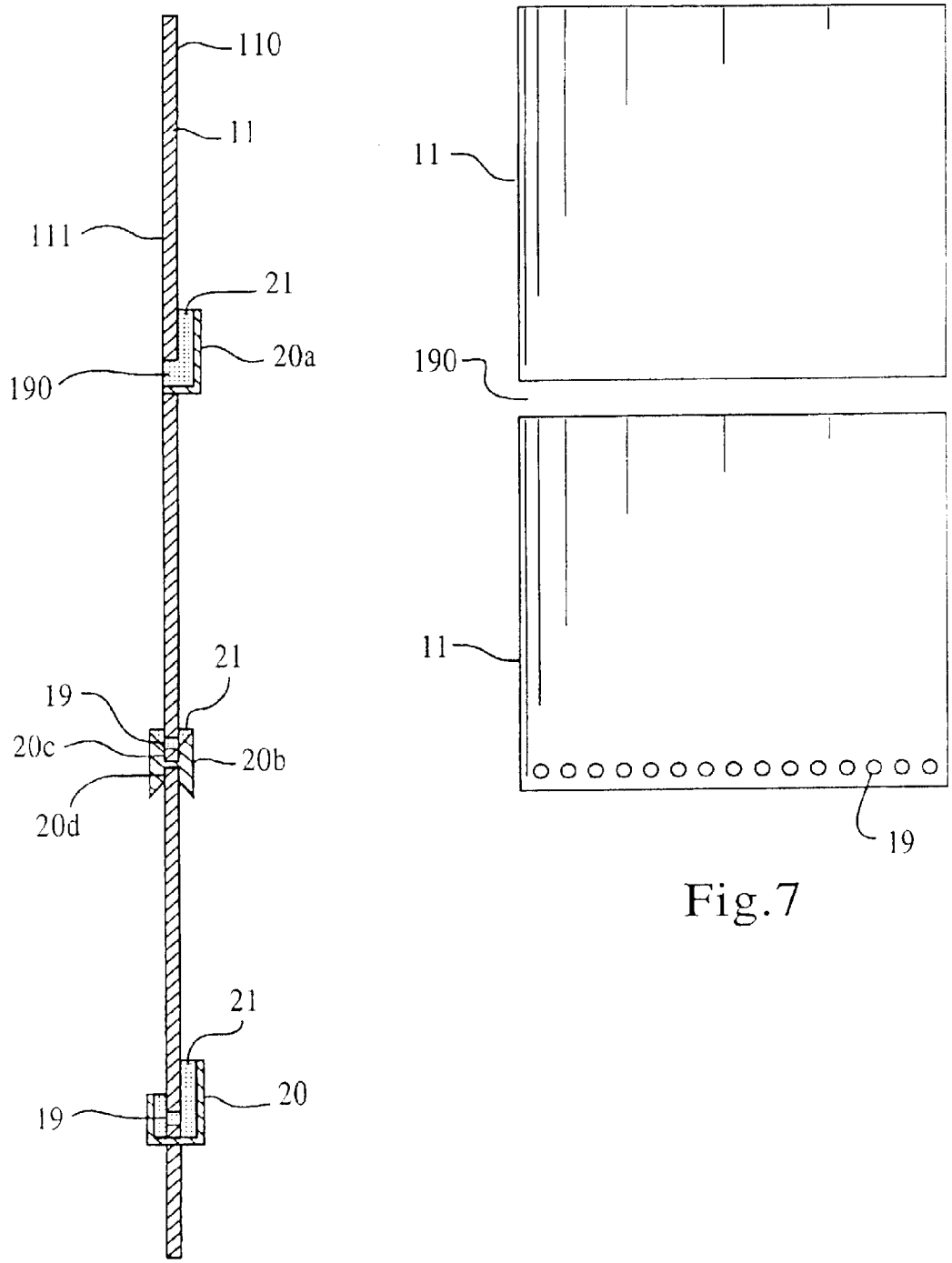
FIG. 6 shows another embodiment for the heat-exchanging plate and water-trapping reservoirs of the present invention.
FIG. 7 shows a plain-surface structural view of the heat-exchanging plate embodied in FIG. 6.

Apart from means of round-hole shape (not limited to round holes), the water saturation apertures 19 of the heat-exchanging plates 11 can be implemented as shown in FIG. 6 and FIG. 7, which refers to the formation of a slit between two heat-exchanging plates 11 as the water saturation aperture 190, another design that achieves the identical object.

FIG. 6 also shows an embodiment wherein the water-trapping reservoirs 20 have different shapes, that is, the water-trapping reservoirs 20a can also be formed in L-shape apart from being U shape as the water-trapping reservoirs 20, and the location of the water-trapping reservoir 20a on one side of the second gas passage 13 is higher than that of the water saturation apertures 19 (190). Furthermore, the water-trapping reservoirs 20 can be formed as H-shaped water-trapping reservoirs 20b, and with the concave portions 20c and 20d mounted therein, the H-shaped water-trapping reservoirs 20b can further be held and fixated between the heat-exchanging plates and those underneath. The location of the water-trapping reservoirs 20b on one side of the second gas passage 13 is also higher than that of the water saturation apertures 19(190). By the same token, the V-shaped water-trapping reservoirs not shown in figures can also be embodied in the present invention.

Figure 8:
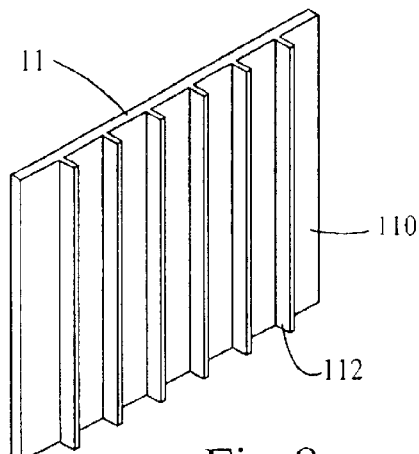
FIG. 8 shows a perspective view of the condensation surface with fins disposed thereon of the heat-exchanging plate of the present invention.

The heat-exchanging plates 11 of the present invention may be processed on the condensation surfaces 110 thereof, such as adding fins 112 to increase the heat conduction area as shown in FIG. 8, or being hydrophobically processed by applying a layer of Teflon so as to reduce the adhesion of water drops and, by being conducive to condensation water's swift sliding downwards, increase the effect of condensation and heat conduction.

Figure 9:
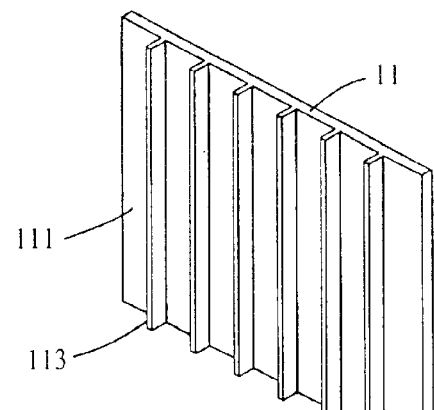
FIG. 9 shows a perspective view of the evaporation surface with fins disposed thereon of the heat-exchanging plate of the present invention.
Figure 10:
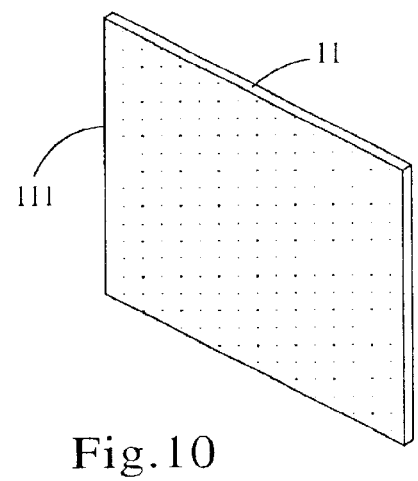
FIG. 10 shows a perspective view of the evaporation surface of the heat-exchanging plate of the present invention after being coarsely processed.

For the purpose of proportionally distributing the condensation water 3 acquired through permeation by moisture-absorption effect from the second gas passage 13 via the water saturation apertures 19 on the metal evaporation surface 111, thus absorbed by oxygen/air drawn in so as to acquire the humidification effect, fins 113 can be mounted on the evaporation surface 111 so as to increase the heat conduction area as shown in FIG. 9. Or the evaporation surface 111 can be applied with adequate metal evaporation and heat conduction processing such as coarsely processed as shown in FIG. 10, such that the condensation water 3 can easily be evaporated and subsequently be absorbed by dry and cool oxygen/air drawn in, so as to increase the adhesion of the liquidized water, thus be conducive to allowing the liquidized water to form a membrane and therefore enhance the evaporation and heat conduction effect.

Figure 11:
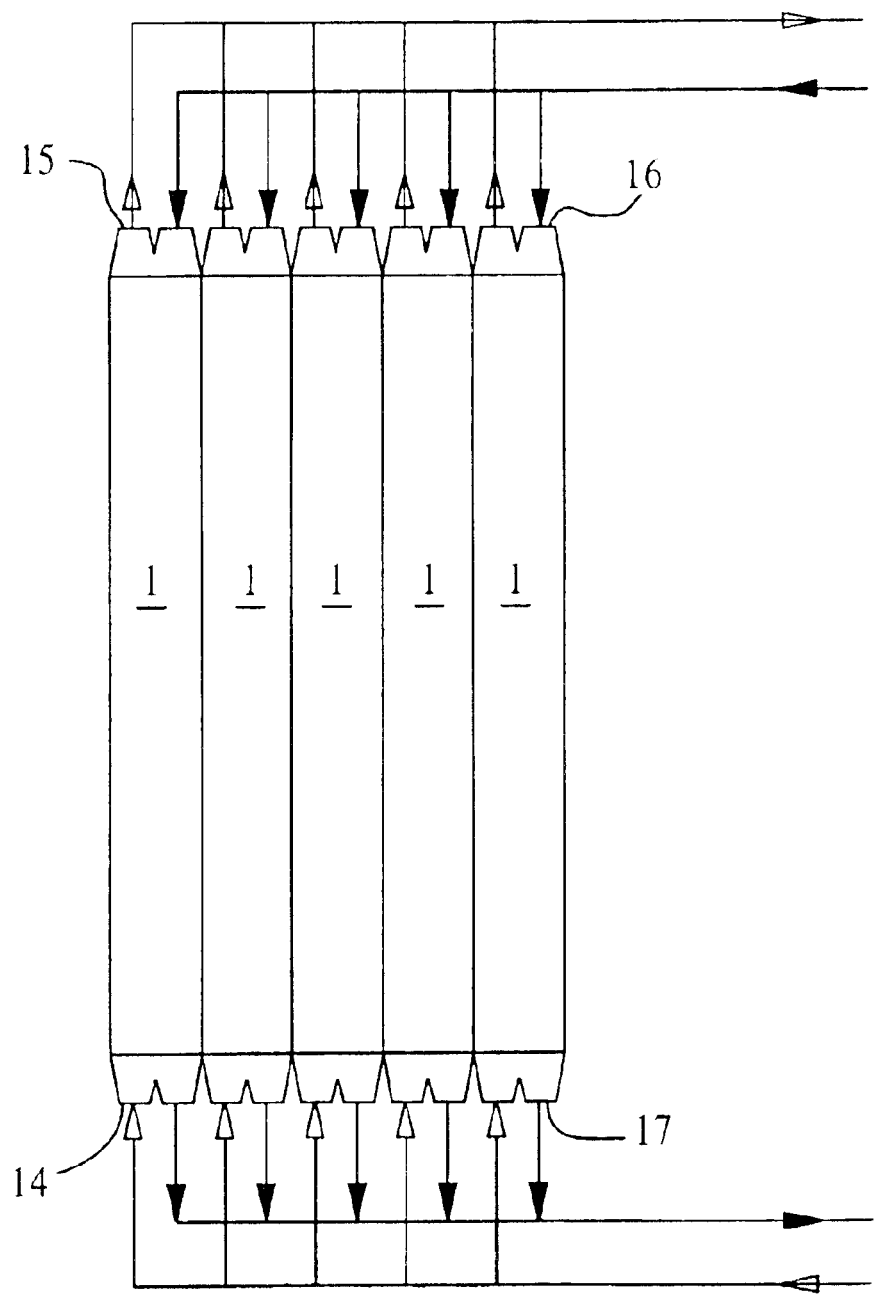
FIG. 11 shows a schematic diagram of a plurality of the present invention connected in parallel to form a multi-module assembly.

The humidifier 1 of the present invention is modularly designed for adjusting to power generation systems in fuel cells having different power generation capacities. The outer appearance of the single module of the present invention is shown in FIG. 1, and the multiple-module design is formed in parallel as shown in FIG. 11, which also simplifies the design and assembling procedures and thus reduces the production cost.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A humidifier, comprising:
   a housing, including a plate having a solid portion formed inside said housing, and defining a first gas passage and a second gas passage by said plate, said first gas passage and said second gas passage having gas inlets and gas outlets respectively;
   a plurality of apertures formed on said plate;
   a water absorbable and permeable stuffing material; and
   a plurality of reservoirs for trapping and storing water, said plural reservoirs fixed under said apertures, and said plural reservoirs filled with said water absorbable and permeable stuffing material.

2. The humidifier as in claim 1, wherein said gas inlet of said first gas passage is for conveying air or oxygen therein, whereas said gas outlet of said first gas passage communicates with an air or oxygen inlet of a fuel cell, and wherein said gas inlet and said gas outlet of said second gas passage are for conveying in and out of exhaust gas respectively.

3. The humidifier as in claim 1, wherein said plate is for exchanging heat.

4. The humidifier as in claim 1, wherein said plate is made of metal.

5. The humidifier as in claim 1, wherein said plate is vertically mounted.

6. The humidifier as in claim 1, wherein said water-trapping reservoir is formed as a U-shaped structure, and at least one water-trapping reservoir is mounted.

7. The humidifier as in claim 1, wherein the location of said water-trapping reservoir on one side of said second gas passage is higher than that of said aperture.

8. The humidifier as in claim 1, wherein said first gas passage is disposed with water permeable stuffing material therein.

9. The humidifier as in claim 1, wherein an evaporation surface of said plate facing with said first gas passage is disposed with at least one fin thereon.

10. The humidifier as in claim 1, wherein an evaporation surface of said plate facing with said first gas passage is coarsely processed.

11. The humidifier as in claim 1, wherein a condensation surface of said plate facing with said second gas passage is disposed with at least one fin thereon.

12. The humidifier as in claim 1, wherein a condensation surface of said plate facing with said second gas passage is hydrophobically processed.

13. The humidifier as in claim 1, wherein said water absorbable and permeable material is to fully fill said aperture underneath said plate.

* * * * *